Oct. 7, 1924.

C. F. KETTERING

INTERNAL COMBUSTION ENGINE

Filed Dec. 26, 1918     2 Sheets-Sheet 2

Patented Oct. 7, 1924.

1,511,201

UNITED STATES PATENT OFFICE.

CHARLES F. KETTERING, OF DAYTON, OHIO, ASSIGNOR, BY MESNE ASSIGNMENTS, TO DELCO-LIGHT COMPANY, OF DAYTON, OHIO, A CORPORATION OF DELAWARE.

INTERNAL-COMBUSTION ENGINE.

Application filed December 26, 1918. Serial No. 268,235.

*To all whom it may concern:*

Be it known that I, CHARLES F. KETTERING, a citizen of the United States of America, residing at Dayton, county of Montgomery, State of Ohio, have invented certain new and useful Improvements in Internal-Combustion Engines, of which the following is a full, clear, and exact description.

This invention relates to internal combustion engines and more particularly to an improved method if burning the fuel within the combustion chamber of an internal combustion engine and to an improved type of engine for carrying that method into effect.

One object of the invention is to provide a method of burning fuel within an internal combustion engine adapted to insure the combustion of all the fuel by maintaining it in a state of vaporization during the compression stroke of the engine.

Another object is to provide a method of burning fuel adapted, during the burning of such fuel to insure an effective temperature above the condensation temperature of the fuel at the maximum compression attained.

A further object is to provide a method of burning fuel within an engine adapted to eliminate from such engine any carbon deposits that may have been formed during the operation of the engine.

Still another object is to provide an improved form of engine arranged for carrying my method of fuel combustion into effect.

Further objects and advantages of the present invention will be apparent from the description thereof set out below, taken in connection with the accompanying drawing.

My method of fuel combustion has been worked out particularly in connection with the burning of kerosene in engines operating upon the Otto or Clerk cycles. And for purpose of description I have illustrated, as the form of apparatus adapted to carry out my method, an engine constructed for operating upon kerosene. It is to be expressly understood, however, that my invention is by no means limited in its applicability to an engine designed to operate upon kerosene since it is just as applicable to an engine operating upon any other type of fuel.

One of the greatest difficulties heretofore experienced in the operation of internal combustion engines has been the deposition of carbon upon the walls of the combustion chamber, especially in the immediate neighborhood of the intake valve. I have discovered that one cause of this carbon is the condensation of a part of the vaporized fuel upon the walls of the combustion chamber during compression. This condensation is generally due to the presence of cold spots in the combustion chamber wall, the fuel condensed upon such spots being coked, with a resulting carbon deposit.

A further cause of carbon deposits is the deposition of combustion residues upon the cold spots in the walls of the combustion chamber, or upon the entire wall when the engine is first started, that is, before it is hot. This difficulty has been especially pronounced in engines operating upon kerosene and other heavy fuels.

Recognizing this defective operation which characterizes the present types of internal combustion engines I have devised a method of burning the fuel within the combustion chamber which prevents the condensation of the fuel upon the walls thereof after the engine has heated up and also dissipates any combustion residue that may be deposited, a method which insures clean burning of the fuel with a consequent elimination of the troubles resulting from carbonization.

For carrying my method into effect I make use of the apparatus illustrated in the accompanying drawing in which.

Figure 1:
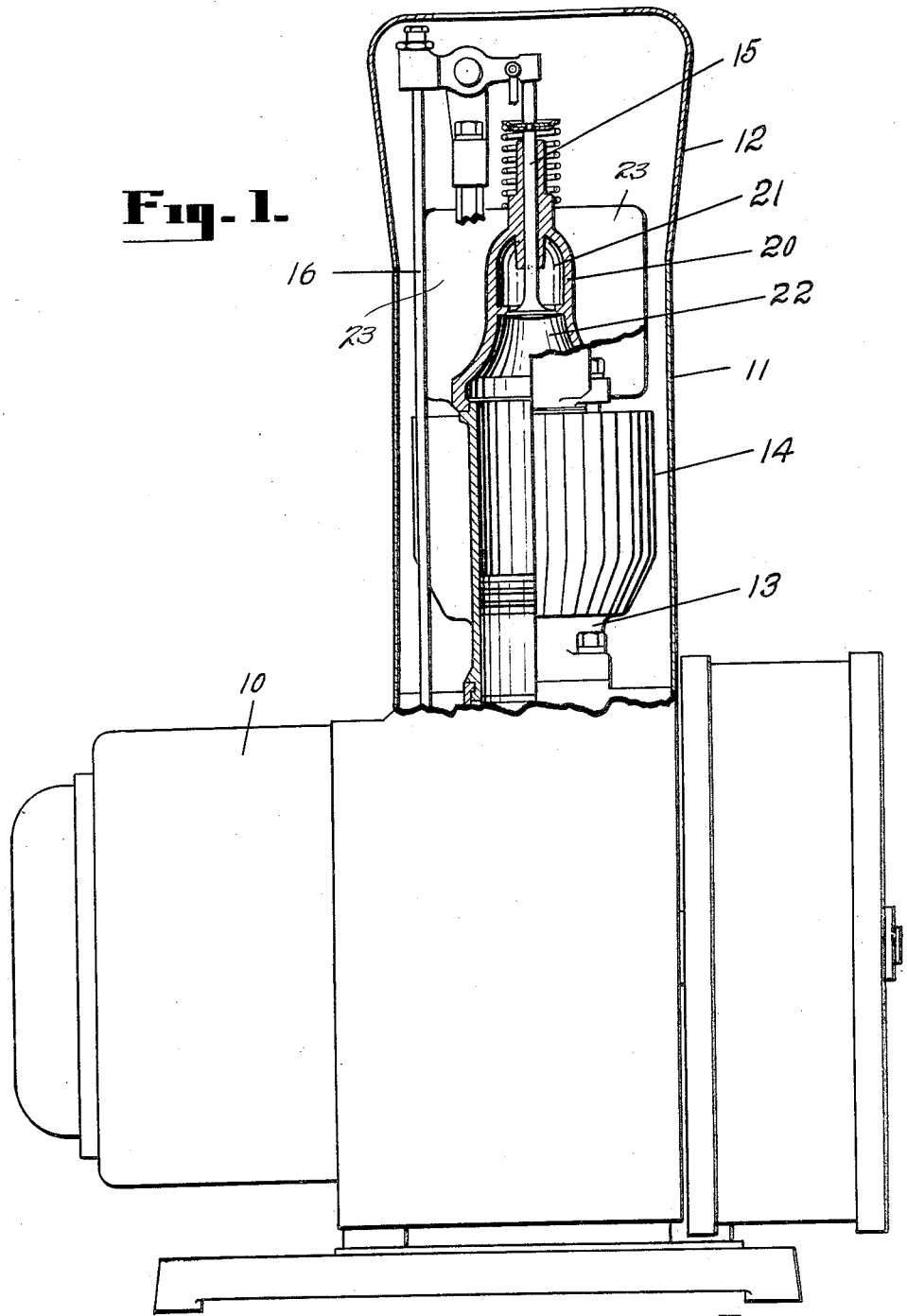
Fig. 1 illustrates a side view of a single cylinder internal-combustion engine, partly in section, the section through the cylinder head being taken in part along the line A—A and in part along the line B—B of Fig. 1, looking in the direction of the arrows, to more clearly illustrate the structure of the combustion chamber.

In the drawing, 10 designates a single cylinder internal-combustion engine constructed for operation with kerosene and comprising jacket 11, hood 12, cylinder 13 provided with radiating fins 14, valve 1 mechanism 15 and valve operating mechanism 16, all of usual and well known construction. Rigidly secured to the upper end of the cylinder 13 is a cylinder head 20 the upper part of which contains chambers 21 and 21ª connected respectively with the inlet and exhaust manifolds, and the lower part of which comprises a combustion chamber 22 which is co-axial with the cylinder 13. Communication of the combustion chamber 22 with the intake chamber 21 and the exhaust chambers 21ª is controlled by the valves 15 and 15ª respectively. The head 20, as shown in Fig. 1, is bell shaped in cross section, the inner surface of the wall of the combustion chamber being convex and the outer surface thereof concave. Carried by the outer surface of the cylinder head are a number of radiating fins 23. Surrounding the exhaust pipe 24 are fins 25, and carried by the wall of the combustion chamber below the exhaust pipe are several shorter fins 26, shown in Fig. 2. The shorter fins 26 and the fins 25 are associated only with the exhaust manifold and that part of the combustion chamber lying closely adjacent thereto, these fins being entirely dispensed with on the inlet manifold and that portion of the combustion chamber wall adjacent thereto. These extra radiating fins are used around the exhaust, only, to make more equable the distribution of heat throughout the wall of the combustion chamber.

As can be readily seen from reference to Fig. 1 of the drawing the wall of the combustion chamber is concavo-convex and so arranged that it has exposed to the interior thereof a greater surface area per unit of volume within the combustion chamber than would be possible if this wall was not so shaped. With the wall arranged as shown it is obvious that there will be a tendency for the inner surface of the wall to absorb a greater number of heat units than can be radiated by the outer surface thereof. Consequently the temperature of the inner surface of the wall will be maintained higher than is ordinarily the case in internal-combustion engines of this type. That is to say, the formation of the wall of the combustion chamber is such that the heat absorbed by the inner surface as it passes through the wall to its outer surface undergoes somewhat the same action as does water when it passes through a funnel. As a consequence there is what might be called a tendency to crowd the heat into a smaller space which results in more even distribution of the heat over the inner surface, and at the same time an increase in the temperature over such inner surface.

If auxiliary cooling means were not used in connection with a combustion chamber such as described the temperature of the walls would tend to rise too high, probably above red heat, with resulting preignition. In order to dissipate a part of this undesirable heat the radiating fins shown in the drawing have been provided. Inspection of the drawing will show that these fins are so arranged that they radiate heat after it has reached the outer surface of the combustion chamber walls. Consequently these radiating fins do not in any way interfere with the balanced relation existing between the inner and outer surfaces of the combustion chamber wall, which relation governs the heat distribution thereover.

Figure 2:
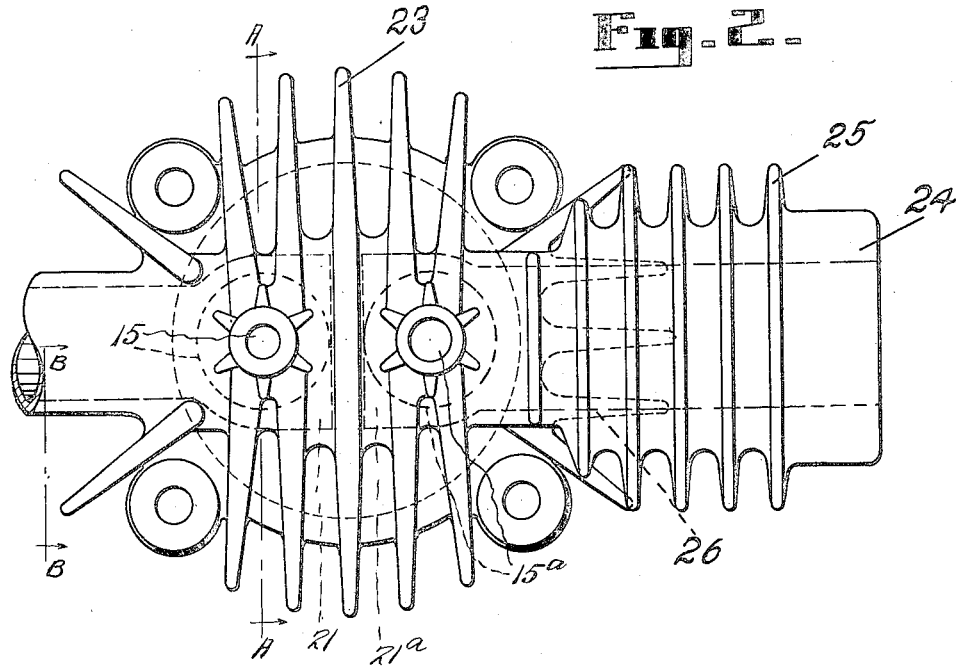
Fig. 2 is a plan view of the cylinder and combustion chamber illustrated in Fig. 1.

As shown in Fig. 2 the lower part of the cylinder head is substantially circular in cross section. The upper part of the cylinder head, however, is so arranged, in order to receive the inlet and exhaust valves, that, in cross section, it is ellipsoidal or even rectangular. It has been found that under actual operating conditions it is not necessary to maintain the bell shape throughout the entire length of the cylinder head. It is desirable that the upper part of the cylinder head be maintained at a reasonably high temperature in order to assist in vaporization of the incoming fuel as it passes into the combustion chamber though the means for accomplishing this result forms no part of the present invention. The present invention has to do with conditions affecting the fuel after it has passed into the combustion chamber, with the burning of the fuel to insure complete combustion thereof and to prevent any trouble from carbonization. The combustion chamber wall is therefore designed to maintain vaporization of the fuel after it passes through the inlet valve by providing a large radiating or vaporizing surface having a uniform heat distribution thereover, the minimum temperature being above the condensation temperature of the fuel at the compressions used. It is further designed to maintain the temperature thereof as high as practicable, that is as high as may be without exceeding the ignition temperature of the fuel, to dissipate any combustion residue that may at any time be deposited within the combustion chamber, thus leaving the engine entirely free from carbon deposits and the troubles arising therefrom. Obviously these conditions might be attained without the use of a truly bell shaped combustion chamber, other types of construction being as well adapted for securing them. And in actual practice I have used a cylinder head which is not truly bell shaped inasmuch as this lends itself to more ready and satisfactory manufacture.

Figure 3:
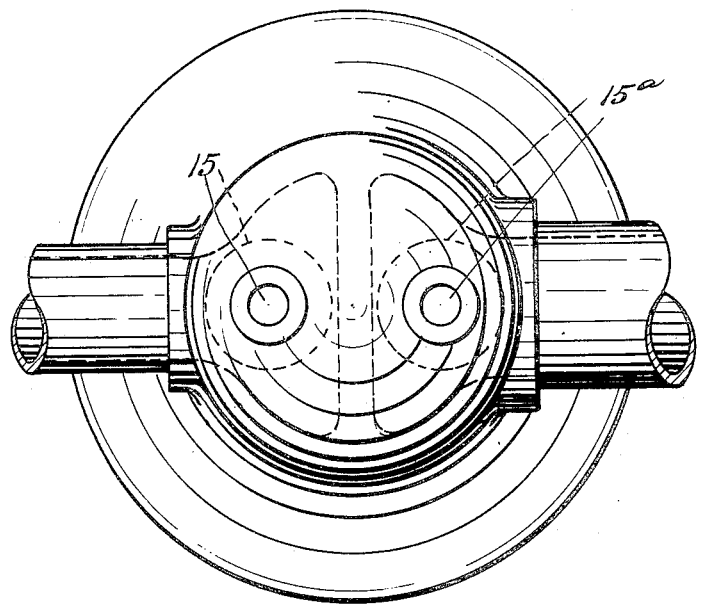
Fig. 3 is a modified form of apparatus in which the cylinder head is shown as completely bell shaped. the radiating fins carried thereby being not shown in order that the form of the cylinder head may be more clearly illustrated.

In Fig. 3, however, I have illustrated a form of cylinder head which is bell shaped throughout. In other words a longitudinal, or vertical, section through the cylinder head disclosed in Fig. 3, taken along any desired axial plane, would show a section substantially identical with the sectional view of the cylinder head disclosed in Fig. 1. In actual practice a cylinder head constructed in accordance with the disclosure of Fig. 3 would bear radiating fins upon its outer surface similar in structure and function to the fins disclosed in Figs. 1 and 2. For purpose of clearer illustration, however, these fins have been entirely omitted from Fig. 3. With the exception of the slight difference in structure arising from the device illustrated in Fig. 3 being completely bell shaped and the device illustrated in Figs. 1 and 2 not being completely bell shaped, the two devices are identical.

From the foregoing description it is quite obvious that in order to burn fuel in accordance with my method which method insures complete combustion of the fuel and the elimination of all carbon deposits, it is necessary to maintain the temperature within the combustion chamber as high as possible without causing preignition, the temperature of all material exposed to the interior thereof being maintained at a minimum which is above the condensation temperature of the fuel used at the compressions attained. And in carrying that method out it is necessary to so construct the combustion chamber that not only shall such temperature of the inner surface of the wall thereof be attained but to so construct that chamber that this temperature shall be maintained uniform over the entire surface exposed to the fuel within the combustion chamber.

It is to be expressly understood that while I have shown a special type of engine for carrying out my method of fuel burning I am by no means limited to this precise type, inasmuch as many other types of engines might be constructed coming within the scope of that invention. For instance the disposition of metal in the walls of the combustion chamber might be the same as in the conventional internal combustion engine now used and suitable insulation used with those walls to secure the desired conditions. Or walls made of a poor, or non-conductor, of heat might be used. For a true definition of my invention therefore reference should be had to the appended claims.

What I claim is:

1. An internal-combustion engine having overhead intake and exhaust valves, comprising in combination, a cylinder, a cylinder head bell-shaped in axial cross section, and a relatively thin wall in said cylinder head intermediate its ends and transverse to the axis thereof, said wall being provided with ports and seats for the intake and exhaust valves.

2. An internal-combustion engine having overhead intake and exhaust valves, comprising in combination, a cylinder, a cylinder head bell-shaped in axial cross section, a horizontal wall in the cylinder head to provide a combustion chamber in the lower part thereof, and a vertical wall extending upwardly from the horizontal wall to provide intake and exhaust chambers in the cylinder head, ports in the horizontal wall between the combustion-chamber and the intake and exhaust chambers, valves for closing said ports, and cooling fins associated with the cylinder head.

3. In an internal-combustion engine having overhead intake and exhaust valves; a combustion-chamber having side walls and a top wall, the top wall being provided with ports and seats arranged side by side for the intake and exhaust valves, and said side walls being of single thickness with the inner and outer surfaces convex with respect to the interior of the combustion chamber.

4. In an internal-combustion engine having overhead intake and exhaust valves; a combustion chamber having side walls and a top wall, the top wall being provided with ports and seats for the intake and exhaust valves, and said side walls being of single thickness with the inner and outer surfaces convex with respect to the interior of the combustion-chamber.

5. In an internal-combustion engine having overhead intake and exhaust valves; a combustion chamber having side walls and a top wall, the top wall being provided with ports and seats for the intake and exhaust valves, and said side walls being of single thickness with the inner and outer surfaces convex with respect to the interior of the combustion chamber, and cooling fins associated with the exterior surface of said combustion chamber.

In testimony whereof I affix my signature.

CHARLES F. KETTERING.

Witnesses:
J. H. McDONALD,
MILDRED A. PEARE.